May 27, 1930.  C. MARCH  1,760,761
BREAD BOX
Filed April 7, 1928
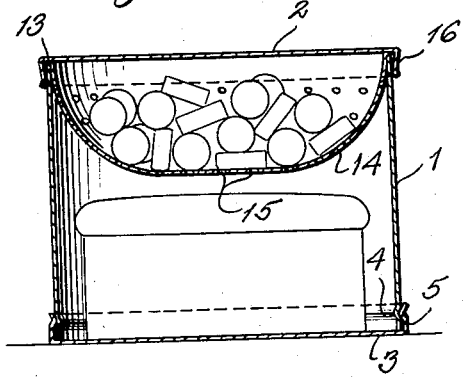
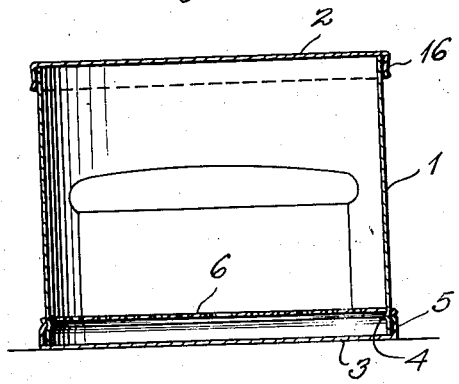
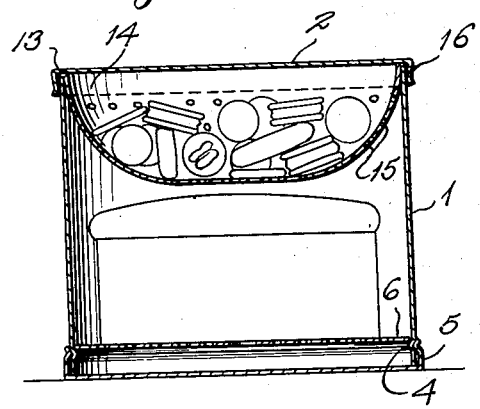
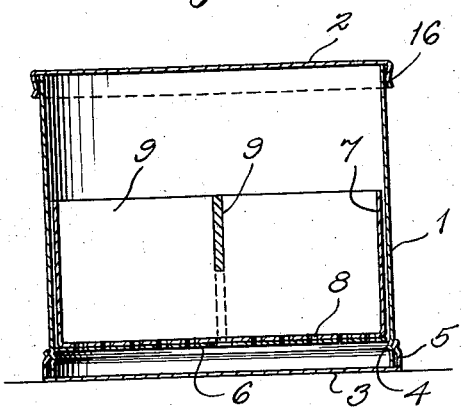
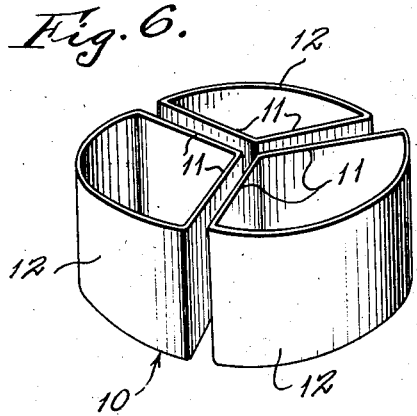
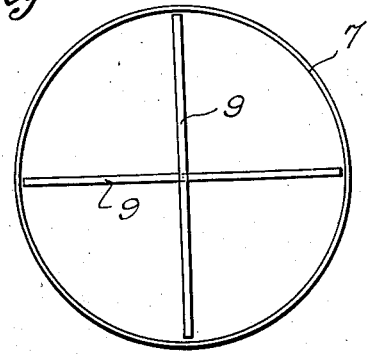
Carl March
INVENTOR
BY *Victor J. Evans*
ATTORNEY
WITNESS:

Patented May 27, 1930

1,760,761

UNITED STATES PATENT OFFICE

CARL MARCH, OF CHICAGO, ILLINOIS

BREAD BOX

Application filed April 7, 1928. Serial No. 268,183.

This invention relates to bread and cake boxes and its general object is to provide a box of this character that can be kept in a clean and sanitary condition as well as free from crumbs and the like in an easy manner with very little effort.

A further object of the invention is to provide a box for bread and cakes, that cannot only be used for housing loaf cake and bread, but also rolls and fancy cakes which are retained separate from the loaf cake and bread in a container removable from the box.

Another object of the invention is to provide a box havng separable removable compartments therein.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a transverse sectional view taken through a box constructed in accordance with my invention and showing the removable container therein.

Figure 2 is a similar view with the container removed.

Figure 3 is a view similar to Figure 1 with a supporting disk arranged in the box.

Figure 4 is a view showing removable partitions in a container in said box.

Figure 5 is a top plan view of a container with partitions therein, as shown in Figure 4.

Figure 6 is a perspective view of modified forms of compartments for the box.

Referring to the drawings in detail, the reference numeral 1 indicates the body of the box which forms the subject matter of the present invention and the body is of hollow cylindrical formation with open ends and adapted to be closed by a flanged top 2 and a flanged bottom 3.

The body adjacent its lower edge is formed with an annular inwardly extending bead 4 providing an annular depression about the outer surface of the box as shown, and this depression is adapted to receive a bead formed with the flange 5 of the bottom for securing the bottom to the body in a manner to prevent casual removal thereof as will be apparent.

The bead 4 is adapted to receive an apertured disk 6 which reposes upon said bead as shown, with the result the disk is removable from the box. The disk is adapted to receive a loaf of bread or the like as shown in Figures 1, 2 and 3, or a container indicated by the reference numeral 7 which is removable from said box and has openings 8 formed therein and adapted to register with the apertures in the disk as shown in Figure 4. Removably disposed in the container 7 are partitions 9 which are slotted centrally for a portion of their width for the purpose of cooperating with each other to provide compartments.

In Figure 6 I have illustrated modified forms of compartments, and these compartments are provided by separate receptacles indicated by the reference numeral 10. The receptacles are each formed with converging walls 11 and a curved wall 12 whereby when the converging walls of each of the receptacles are arranged in contacting engagement, the receptacles cooperate to provide separate compartments capable of being arranged in the box.

Supported by the upper edge of the body and being provided with a curved flange 13 for that purpose is a container 14 of substantially hemispherical formation and has openings 15 formed in its walls as shown. The container 14 is adapted to accommodate cakes and rolls with the result these articles can be retained separate from other products in said box as shown in Figures 1 and 3. The flange of the top 2 is indicated by the reference numeral 16 and is curved upon itself so as to frictionally engage the upper edge of the body.

From the above description and disclosure of the drawings, it will be obvious that I have provided a box primarily designed for housing bread and cakes with means for separating the respective products and the box can be kept in a clean and sanitary condition with very little effort, due to the fact that the respective parts are removably associated.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A bread and pastry storage device comprising a hollow cylindrical body, a separate bottom therefor, an annular bead formed with said body adjacent its lower edge and providing an annular depression about the outer surface thereof, a flange formed on said bottom and being provided with a bead adapted to be received in said depression, a disk supported by said bead and being apertured to allow for the passage of crumbs therethrough, a top for said body, a flange for said top and being curved to frictionally engage the upper edge of said body, and a container means detachably arranged in said body.

In testimony whereof I affix my signature.

CARL MARCH.